May 6, 1952     H. NUTT     2,596,040
PEDAL CONTROLLED COLLAPSIBLE LINKAGE FOR CENTRIFUGAL CLUTCHES
Filed Oct. 27, 1949     2 SHEETS—SHEET 1

Inventor
Harold Nutt

May 6, 1952           H. NUTT           2,596,040
PEDAL CONTROLLED COLLAPSIBLE LINKAGE FOR CENTRIFUGAL CLUTCHES
Filed Oct. 27, 1949           2 SHEETS—SHEET 2
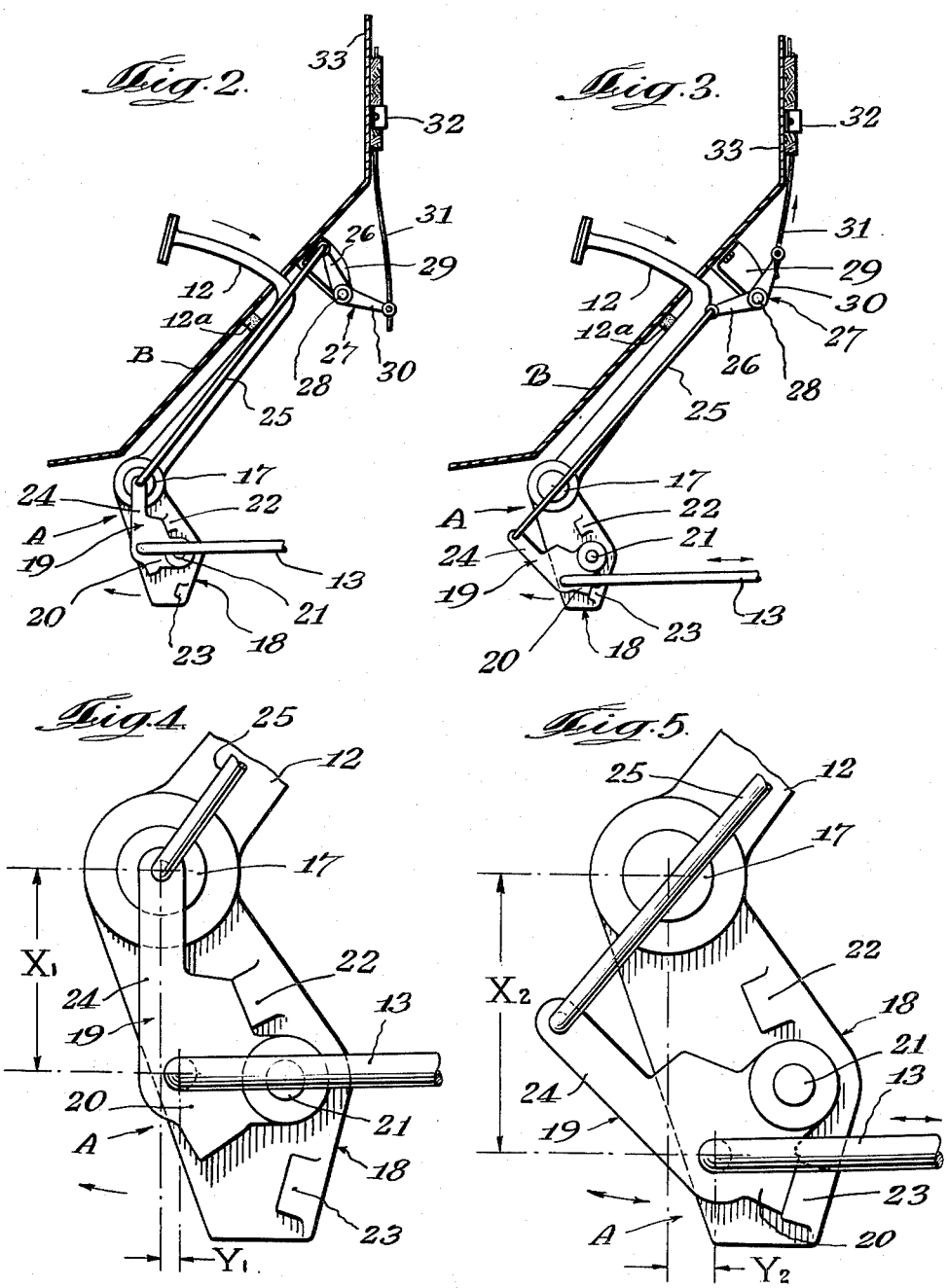

Patented May 6, 1952

2,596,040

UNITED STATES PATENT OFFICE 2,596,040

PEDAL CONTROLLED COLLAPSIBLE LINKAGE FOR CENTRIFUGAL CLUTCHES

Harold Nutt, Chicago, Ill., assignor to Borg-Warner Corporation, Chicago, Ill., a corporation of Illinois Application October 27, 1949, Serial No. 123,970

9 Claims. (Cl. 74—522)

1

The present invention relates to a linkage assembly for varying the ratio of movement of a clutch pedal with respect to the release mechanism of a friction clutch assembly of the centrifugal type. The instant improvements comprise a shiftable linkage which is associated with the clutch pedal control and pull rod for the purpose of avoiding additional pedal travel when it is desired to engage or lock the clutch for the purpose of securing a "push-start" for the engine. The parts of the linkage assembly are arranged so that the effective length of the pull rod shortens to allow the clutch release mechanism, including the thrust bearing or shift collar, to move the clutch levers toward the rear, thereby permitting the clutch to be engaged by the clutch packing springs so that the vehicle may be pushed to start the engine.

The arrangement contemplates the changing of the pedal linkage from a first ratio to a second ratio by means of a Bowden wire button or the like conveniently mounted on the dashboard or instrument board of the vehicle for manual operation. When the Bowden wire is operated, suitable means, preferably in the form of a lever, swings from one position to another to shift the pull rod downwardly from the pedal fulcrum. This increases the effective length of the lever at the lower end of the pedal and at the same time moves the pull rod forward so as to allow the release bearing to withdraw from the clutch fingers or levers to positively engage the clutch. Also, the modified pedal ratio reduces the amount of pedal travel needed to release the clutch. It is necessary that the arrangement of the parts of this linkage be such that when the pull rod is moved from its normal position and the clutch pedal is depressed there will be enough travel so as to allow the clutch release mechanism, including the shift collar, to move the ends of the clutch levers or fingers toward the front and thus initially disengage the clutch while the vehicle is being moved to attain momentum for cranking the engine through the driving wheels. After starting the engine and the car attains speed driven thereby, the button on the dash is moved to normal position and the linkage is restored to its normal position by the operator.

An advantage of the present assembly resides in the fact that a desirable pedal travel is attained for push-starting the motor without increasing the normal pedal stroke. Also, the arrangement is simple for a driver to operate, and furthermore the linkage is not complicated in construction so that it may be readily installed on a motor vehicle which is in use. It is contemplated that the variable ratio linkage be assembled either directly upon the manually operated clutch pedal or upon a shaft on which the pedal is fulcrumed.

Other aims and advantages of the improvements contemplated herein will be apparent to persons skilled in the art after the construction and operation of this linkage assembly is understood from the within description. It is preferred to attain these advantages and to practice the invention in substantially the manner hereinafter described and as more particularly pointed out in the appended claims. Reference is now made to the accompanying drawings that form a part of this specification.

In the drawings:

Fig. 2 is a view in side elevation showing details of the linkage assembly in cooperative association with the clutch pedal, the parts being in normal positions.

Fig. 3 is a view similar to Fig. 1 showing the relative positions assumed by the parts of the linkage for starting or cranking the motor by push by a second vehicle.

Figs. 4 and 5 are diagrammatic views which show the changes of ratios of the linkage assembly, Fig. 4 being the normal position, and Fig. 5 being the shifted position of pedal engagement of the clutch.

The drawings are to be understood as being more or less of a diagrammatic character for the purpose of disclosing a typical or preferred embodiment of the improvements contemplated herein. In these drawings, like reference characters identify the same parts of the different views.

Figure 1:
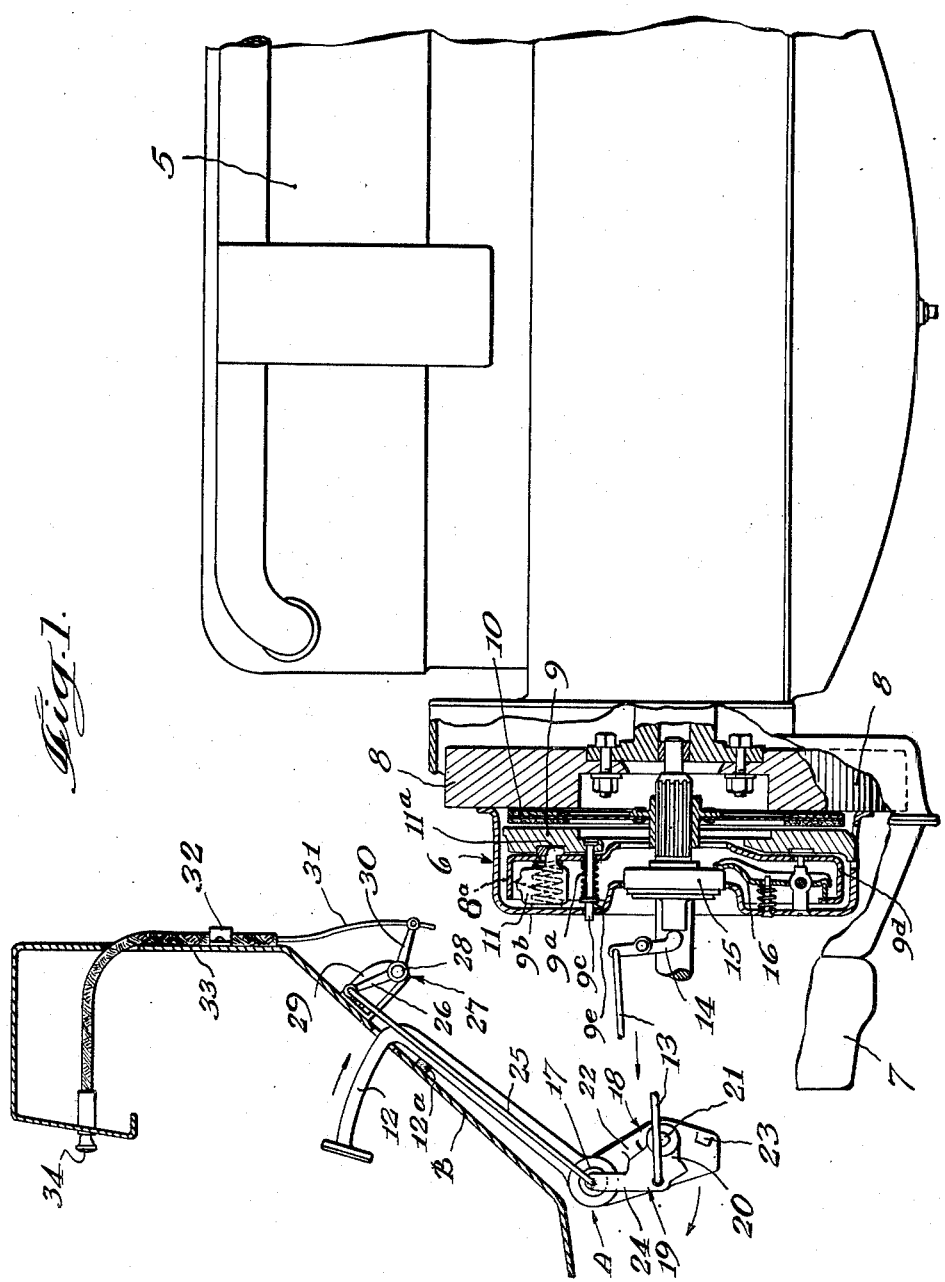
Fig. 1 is a diagrammatic view of the driving assemblies of a motor vehicle showing the application of the linkage assembly thereto.

The clutch assembly which has been selected for the purpose of illustrating the present improvements is to be regarded as a typical example of a centrifugal clutch. In Fig. 1 there is diagrammatically shown, in tandem arrangement, the engine or motor 5, the clutch assembly 6 and the transmission 7. The clutch assembly in the illustration generally includes the engine fly wheel 8, the axially shiftable pressure plate 9, and the driven friction clutch disc 10 which is between the fly wheel and pressure plate and is carried by the adjacent portion of the input shaft of the transmission 7. The pressure plate, which is urged towards the clutch disc by packing springs 8a, is normally held out of engagement with said disc at idling engine speed by the release bearing which is positioned by means of the control linkage to accomplish this when the pedal is against the foot board stop 12a. Retraction pins 9c, which are carried by the pressure plate 9, project through the reaction plate 9d and are guided in the axially extending back wall of cover 9b. The retractor springs 9a, surrounding the pins between the reaction plate 9d and shoulders 9e on said pins, operate to hold the pressure plate 9 away from or off the driven disc 10 until engine speed is raised above idling speed, whereupon the pressure plate is adapted to be engaged with the driven disc by the centrifugal action of weights 11, the angular feet 11a of which fulcrum on the pressure plate 9 and the reaction plate 9d in the usual manner of centrifugal clutches. When the engine speed is increased, by manually operating the throttle, the weights will swing radially outward to urge the pressure plate, in opposition to the springs, toward the fly wheel thereby to pack the clutch driven disc between the pressure plate and the fly wheel. When it is desired to manually release the clutch assembly, the clutch pedal 12 is depressed and the pull rod 13, connected at one end of the pedal 12, is drawn rearwardly so that its other or forward end, which is connected to a fork or yoke 14, will shift the ball bearing or thrust collar 15 to move the latter in a direction toward the clutch assembly thereby rocking the clutch release levers 16 which will withdraw the pressure plate 9 from the clutch disc 10 against the action of the centrifugal weights, thus disengaging the clutch assembly.

As before stated, the present improvements are designed for the purpose of effecting a manual release and engagement of the centrifugal clutch for the purpose of effecting a cranking of the motor or engine by what is commonly known as a "push-start." In other words, the clutch is released by the operator and the vehicle is then pushed by a second vehicle, and after sufficient speed attained, the operator releases the pedal and the clutch assembly will become engaged thus cranking the motor or engine by the momentum of the car or the force applied by the second vehicle.

One of the problems of starting the motor in the manner above described has been to provide a desirable pedal travel with sufficient ratio to produce a low pedal pressure in the normal position, and in order to solve this problem the present variable linkage is interposed between the pull rod 13 and the clutch pedal 12, such linkage being shown in detail in Figs. 2 and 3. Referring to these illustrations it is seen that the clutch pedal is fulcrumed upon the chassis or other fixed part of the vehicle and beneath the footboard B. The fulcrum for the pedal may comprise a large pivot bolt or rock shaft 17, and the clutch pedal preferably has an extension in the form of a lever in the form of a rocker arm 18 extending below the fulcrum 17 in the manner shown. It will be understood, however, that the rocker arm 18 may be an element that is separate from the clutch pedal 12, in which event it may comprise an arm-like member which is secured to an carried by the rock shaft 17. Thus it is apparent that the rocker arm is, in each instance, responsive to movement of the clutch pedal on its fulcrum.

The variable linkage assembly A of which the rocker arm 18 forms a part, preferably comprises a bell crank 19 fulcrumed at 21 on the rocker arm 18, one arm 20 of the bell crank being normally at or above the plane of the fulcrum 21 and has the adjacent end of the pull rod 13 pivotally connected to it so that when the bell crank is moved the end of the rod 13 will travel in a downward direction from its position shown in Fig. 2 to the position shown in Fig. 3. In this latter position the end of the pull rod is in an approximately horizontal plane below the bell crank fulcrum 21. Stop means, which may take the form of lugs 22 and 23 projecting from the rocker arm 18, are provided to define the limits of swinging movement of the bell crank 19. The second or upper arm 24 of the bell crank is normally in the generally upright position as shown in Fig. 2 where its upper end is approximately aligned with the axis of the pedal fulcrum 17.

When it is desired to change the ratio of the linkage assembly A with respect to the pedal 12 and the pull rod 13, the bell crank 19 is moved to its second position (Fig. 3) by means of an actuator member or bar 25 which preferably extends alongside of the portion of the clutch pedal which is beneath the floorboard B. This actuator member or bar 25 is pivotally connected at its lower end to the upper arm 24 of the bell crank 19. The other or upper end of the actuator bar is pivotally connected to a first arm 26 of a walking beam member 27 which is pivoted at 28 on the adjacent end of a bracket 29 bolted or otherwise secured to the underside of the footboard B. The second arm 30 of the walking beam member 27 has its end pivotally attached to a Bowden wire 31 that extends upwardly and has its end region carried in a supporting clip 32 secured to the front side of the dashboard or instrument board 33 where it has a suitable button 34 attached to its upper end in convenient reach of the driver of the vehicle.

It will be apparent from Figs. 2 and 3, that whenever the ratio of the linkage assembly A is to be changed or varied, the Bowden wire button 34 is pulled by the driver, thus swinging the walking beam 27 to move it into the position shown in Fig. 3. This simultaneously operates the actuator bar 25 and moves the bell crank 19 to swing until it engages the stop or abutment 23 as shown in Fig. 3. It is now apparent that this change of position has shifted the pull rod 13 in a forward direction toward the clutch assembly, and also the bell crank end region of the pull rod has moved downward to a lower plane below the bell crank fulcrum 21. These changes in the linkage are effective to require a depression of the clutch pedal 12 to no greater extent than is normally required to release the clutch for the reason that the effective length of the rocker arm at the bottom of the pedal is increased thus increasing the amount of movement of the clutch release bearing for a given amount of pedal travel.

Referring now to the diagram shown in Fig. 4, the space $X^1$ between the broken horizontal lines represents the vertical distance normally between the horizontal planes of the axes of pedal fulcrum 17 and the adjacent end of pull rod 13 where it is pivotally connected to bell crank 18. The space $Y^1$ between the broken vertical lines shows the horizontal distance between the vertical planes of the axes of these parts. When the linkage ratio has been changed by a pull on the Bowden wire 31 the bell crank assumes the position shown in Fig. 5, wherein it is apparent these two spaces have been altered. This change has moved the end of pull rod 13 downwardly and forwardly so that there is an increased vertical space represented by $X^2$ and also an increased horizontal space represented by $Y^2$. The pedal 12 during this change has not been moved but the pull rod 13 has been shifted longitudinally forward or toward the clutch lever release mechanism with the result that the pedal 12, in order to release the clutch for a "push-start" of the motor, will not travel farther than its normal stroke.

It will be understood that the pedal linkage is under the strain of the clutch packing springs 8a which are located between the reaction plate 9d and the clutch cover 9b. When the release fork 14 is moved away from the throwout bearing or thrust collar 15, after moving the linkage from its normal to the extended position, the clutch levers 16 can move to the left or rearwardly, permitting the packing spring pressure to effect clutch engagement. In this position, however, more movement of the pressure plate must be made when it is necessary to release the clutch manually. This extra movement is made available by the increase in effective lever range from X-1 to X-2 (Figs. 4 and 5), and requires additional pedal pressure but no additional pedal travel.

In the normal position of the linkage, however, when the engine is not running or when it is idling, the clutch is centrifugally released. This means that the thrust bearing or collar is under load and the linkage, extending from the bearing to the pedal stop 12a, also is under load. Thus it is desirable to position the thrust bearing by means of the linkage and the stop on the floor board for engagement by the pedal. At high engine speeds, when the centrifugal weights move outwardly the full amount of their travel, the reaction plate 9d shifts away from the pressure plate 9, after sufficient travel of the plate has taken place to clamp the driven disc. When the reaction plate moves away from the pressure plate, the clutch release levers also move away from the thrust bearing and the pedal linkage is then relieved of all load.

While this invention has been described in detail in its present preferred form or embodiment, it will be apparent to persons skilled in the art, that various changes and modifications may be made therein without departing from the spirit or scope thereof. It is aimed in the appended claims to cover all such changes and modifications.

I claim:

1. In combination with a clutch pedal adapted to release a clutch; a rocker-arm actuated by movement of said pedal; a reciprocal pull-rod responsive to movement of said pedal toward clutch release position; and variable linkage means operatively connecting said pull-rod and rocker-arm, comprising a bell-crank having selective movement to either of two positions independently of said rocker-arm, said bell-crank being connected to an end of said pull-rod; and manually operable means for moving said bell-crank from one to the other of the aforesaid positions thereby to vary the extent of movement of said pull-rod.

2. In combination with a foot pedal adapted to release a clutch; a rocker-arm actuated by movement of said pedal; a reciprocal pull-rod responsive to movement of said pedal toward clutch release position; and variable linkage means operatively connecting said pull-rod and rocker-arm, comprising a bell-crank having selective movement to either of two positions independently of said rocker-arm, said bell-crank being connected to an end of said pull-rod; lever means independent of said pedal and rocker-arm and operatively connected to said bell-crank; and manually operable means for moving said lever means to shift said bell-crank from one to the other of the aforesaid positions for varying the extent of movement of said pull-rod.

3. In combination with a foot pedal adapted to release a clutch; a rocker-arm actuated by movement of said pedal; a reciprocal pull-rod responsive to movement of said pedal toward clutch release position; and variable linkage means operatively connecting said pull-rod and rocker-arm, comprising a bell-crank having selective movement to either of two positions independently of said rocker-arm, said bell-crank being connected to an end of said pull-rod; lever fulcrumed intermediate its end independent of said pedal; an actuating bar connecting an arm of said lever to said bell-crank; and manually operable means connected to another arm of said lever for rocking said lever thereby to move said bell-crank from one to the other of the aforesaid positions and vary the extent of movement of said pull-rod.

4. In combination with a clutch pedal adapted to release a clutch; a rocker-arm actuated by movement of said pedal; a reciprocal pull-rod responsive to movement of said pedal toward clutch release position for operating said lever means; and variable linkage means operatively connecting said pull rod and rocker-arm, comprising a bell-crank carried by and fulcrumed on said rocker-arm for movement independently thereof, said pull-rod being connected at one end to said bell-crank; stops on said rocker-arm defining the limits of the aforesaid independent movement of said bell-crank; and manually operable means connected to said bell-crank for selectively moving said bell-crank against one of said stops thereby to vary the distance between the axis of the pedal fulcrum and the end of said pull-rod which is connected to said bell-crank.

5. In combination a rock shaft; a clutch pedal fulcrumed on said rock shaft and adapted to release a clutch; and means for controlling the travel of said pedal comprising a rocker-member secured to said rock shaft; a bell-crank having radial arms carried by said rocker-member and fulcrumed for swinging movement independent of said rocker-member; stops on said rocker-member alternately engageable by said bell-crank for defining the limits of movement of said bell-crank on said rocker-member; a lever fulcrumed independent of said rocker-member; a longitudinally reciprocable rod operatively connecting said lever to an arm of said bell-crank; and manually operated means for moving said lever to pivotally shift said bell-crank selectively to either of said stops.

6. In combination a rock shaft; a clutch pedal fulcrumed on said rock shaft and adapted to release a clutch; and means for controlling the travel of said pedal comprising a rocker-member secured to said rock shaft; a bell-crank having first and second arms carried by said rocker-member and fulcrumed for swinging movement independent of said rocker-member; stops on said rocker-member alternately engageable by said bell-crank for defining the limits of said independent movement of said bell-crank on said rocker-member; a longitudinal reciprocable rod operatively connected at one end to an arm of said bell-crank; an actuator bell-crank fulcrumed on a stationary member for shifting said first bell-crank; means defining an operative connection between an arm of said first bell-crank and an arm of said operator bell-crank; and manually operated means for moving said operator bell-crank in a direction thereby to move said first bell-crank to engage either of said stops.

7. A structure as defined in claim 6 wherein the operative connection comprises an actuating bar pivotally attached at one end to the bell-crank supported on said rocker member, said actuating bar being pivotally attached at its other end to the actuator bell-crank.

8. In combination a clutch pedal adapted to release a clutch; and a variable linkage assembly for controlling movement of said pedal, and comprising, a rocker-arm responsive to movement of said pedal; a first lever means fulcrumed for limited selective movement on said rocker arm; a second lever means on a fixed fulcrum independent of said pedal and having a connection with said first lever means; manual control means for operating said second lever means; and means defining a connection between said first lever means and a clutch operating member.

9. The arrangement defined in claim 8, wherein the first and second lever means are defined by bell-cranks, and an actuating bar connects an arm of the first bell-crank to an arm of the second bell-crank.

HAROLD NUTT.

REFERENCES CITED

The following references are of record in the file of this patent:

UNITED STATES PATENTS

| Number | Name | Date |
| --- | --- | --- |
| 1,669,970 | Christensen | May 15, 1928 |
| 1,964,383 | Goodyear et al. | June 26, 1934 |
| 2,017,989 | Pleasonton | Oct. 22, 1935 |
| 2,036,004 | Wemp | Mar. 31, 1936 |
| 2,067,970 | Laszlo | Jan. 19, 1937 |
| 2,176,224 | Nutt | Oct. 17, 1939 |
| 2,345,015 | Strandland | Mar. 28, 1944 |
| 2,367,076 | Varblow | Jan. 9, 1945 |
| 2,423,043 | Olstad | June 24, 1947 |
| 2,504,729 | Rajan | Apr. 18, 1950 |

FOREIGN PATENTS

| Number | Country | Date |
| --- | --- | --- |
| 665,009 | Germany | Sept. 13, 1938 |